United States Patent [19]

Romatz

[11] Patent Number: 4,957,303

[45] Date of Patent: Sep. 18, 1990

[54] FOLDABLE ADJUSTABLE WHEELCHAIR

[76] Inventor: Roger J. Romatz, 8520 Division, Richmond, Mich. 48062-0010

[21] Appl. No.: 329,390

[22] Filed: Mar. 27, 1989

[51] Int. Cl.[5] .......... A61G 5/02; B62M 1/14

[52] U.S. Cl. .......... 280/250.1; 280/304.1; 297/433; 297/434; 297/DIG. 4

[58] Field of Search .......... 280/250.1, 304.1; 297/DIG. 4, 433, 434

[56] References Cited

U.S. PATENT DOCUMENTS

| | | | |
|---|---|---|---|
| 2,102,336 | 12/1937 | Roe | 297/433 |
| 2,679,283 | 5/1954 | Mahone | 297/434 |
| 3,618,968 | 11/1971 | Greer | 280/250.1 |
| 3,854,774 | 12/1974 | Limpach | 297/433 |
| 3,937,490 | 2/1976 | Nasr | 280/250.1 |
| 4,033,624 | 7/1977 | Jun | 297/DIG. 4 |
| 4,544,178 | 10/1985 | Al-Sheikh | 297/DIG. 4 |
| 4,676,519 | 6/1987 | Meier | 280/250.1 |
| 4,741,547 | 5/1988 | Tholkes | 280/250.1 |
| 4,840,390 | 6/1989 | Lockhard et al. | 280/250.1 |

*Primary Examiner*—Mitchell J. Hill
*Attorney, Agent, or Firm*—Harness, Dickey & Pierce

[57] ABSTRACT

An adjustable portable wheelchair assembly is disclosed in which the size of the wheelchair in a folded position is significantly reduced by allowing the leg support and arm rest to be positioned in a retracted position when the entire assembly has been folded. In addition, the leg and arm rests can be adjusted to one of several positions in order to better accommodate the various activities that a wheelchair occupant may wish to perform within his chair. The entire frame assembly is formed of a very lightweight metal, such as titanium, thus making the device even more portable.

13 Claims, 1 Drawing Sheet

FOLDABLE ADJUSTABLE WHEELCHAIR

BACKGROUND OF THE INVENTION

The present invention in general relates to wheelchairs that may be folded along a longitudinal axis in order to make them more compact and easier to transport.

Modern wheelchairs typically consist of a left frame portion and a right frame portion, each of which have wheels mounted thereto. The left and right frame portions are interconnected by foldable frame members so that the entire chair may be folded and the right and left frame members brought together to make the chair more compact and easier to transport. Wheelchairs will usually have arm rest portions that extend upwardly away from the frame and thus make the entire chair less compact. In addition, leg supports will usually extend forwardly in front of the chair and also result in the entire chair being less compact. These arm rests and leg supports are necessary for the comfort of the seat occupant but they do significantly increase the size of the folded wheelchair.

Another problem frequently encountered with modern wheelchairs is that the leg and arm rests are not easily adjustable in order to accommodate various types of activities or the growth of a child.

It is important that a wheelchair can be adjusted so that it can be utilized by a chair occupant in various activities. For instance, the arm rest may be quite important when the occupant is being pushed or when he is moving slowly. However, if the occupant is self-propelling his chair by turning the wheels, the arm rest may well be in the way. The seat occupant may typically do this on many occasions; for instance, he may be a participant in a wheelchair race. The seat occupant may also wish to adjust his position within the chair by changing the elevation of the leg supports.

For all of these reasons, it would be beneficial to have a wheelchair that can be folded along a longitudinal axis and in which the leg supports and arm rests may be positioned so that they do not add significantly to the size of the overall folded wheelchair and thus make if less transportable.

It is an object of the present invention to provide a wheelchair that can be folded and in which the leg supports and arm rests have a folded position from which they will not add significantly to the overall size of the folded wheelchair assembly. In addition, the leg supports and arm rests can be adjusted while the chair is in its unfolded use position so that the arm rests and leg supports can accommodate various activities of the seat occupant.

SUMMARY OF THE INVENTION

The present invention provides a portable adjustable wheelchair that can be folded along a longitudinal axis and that has an arm rest assembly that can be fixed at an upper extended position, a lowered out-of-the-way position, or removed entirely from the frame assembly. The leg supports may be fixed at any one of several vertical elevations, may be turned outwardly so that they overlie the main frame section, or they may be removed entirely.

The adjustable arm rest feature is achieved by providing an arm rest with two downwardly extending columns that fit into two receiving tubes on the main frame portions of both the left and right frames. Each column extending from the arm rest has two holes drilled into it at an upper and lower position respectively. An arm rest securing mechanism is mounted upon the receiving tubes and acts to bias a pin through the receiving tubes and into the holes drilled in the arm rest columns. The arm rest securing mechanism may be pulled manually away from the biased position to a retracted unlocked position withdrawing the pins from the holes within the columns and allowing the arm rest to be positioned upwardly, downwardly or removed altogether.

A pivotable latch allows the arm rest securing mechanism to be latched at the retracted unlocked position so that the wheelchair occupant may more easily adjust the arm rests himself. By retracting the arm rest securing mechanism, the arm rest may be pushed downwardly to a vertical level even with the seat of the chair or raised to an upward extended position. The upward extended position may prove the most comfortable position for the seat occupant in the average use situation. However, if the seat occupant is self-propelling the chair, he may find if more comfortable to have the arm rest in its lowered position or have the arm rest removed entirely.

The leg supports are pivotally attached to a post member and in addition a toothed gear-like member is fixed to the leg support. A cam and handle are pivoted to the post member, and a spring biases the handle and cam to a position where the cam engages one of the teeth of the gear-like member that is fixed to the leg support. When the cam engages the tooth of the gear-like member, the leg support is locked at a selected vertical position relative to the post and the associated wheelchair frame. By moving the handle on the cam against the bias, the cam can be withdrawn from the tooth of the gear-like member, and the leg support and its associated gear-like member can be turned to a different selected vertical position. Once the proper vertical position is achieved, the handle can be released and the bias will return the cam into engagement with the tooth of the gear-like member, thus locking the leg support at its new selected position. This proves useful in allowing the seat occupant to have his body supported in a variety of profiles for various activities that the seat occupant may be performing. In addition, by allowing the leg support to be adjustable, a completely retracted position is available that will allow the leg support to be withdrawn to its lowest vertical position at which it will not be extending forwardly from the chair at all. This allows the overall chair profile to be smaller and makes the folded chair assembly more compact and easier, to transport.

In addition to this first adjustability, the post that the leg support is rotatably mounted within a socket secured to the main wheelchair frame. A pin assembly locks the post and its associated leg supported at a selected angular position within a socket member. The pin assembly is actuatable by a button to move to a retracted position and to release the pin and allow the post and its associated leg support to be rotated to a second out-of-the-way position. In addition, when the pin mechanism is in its retracted position, the entire post and its associated leg support may be withdrawn entirely from the chair. By rotating the post and its associated leg support to its out-of-the-way position, or by removing the leg support entirely, a more compact folded chair assembly is achieved.

In addition, the entire frame assembly is made of a very lightweight metal, preferably titanium, which will result in an overall more portable wheelchair assembly.

The present invention achieves all of these stated objects with an assembly that utilizes relatively few moving parts and is quite sturdy.

These and other objects and features of the present invention can be best understood upon consideration of the following specification and attached drawings, of which the following is a brief description thereof.

DETAILED DESCRIPTION OF THE PREFERRED EMBODIMENT

Figure 1:
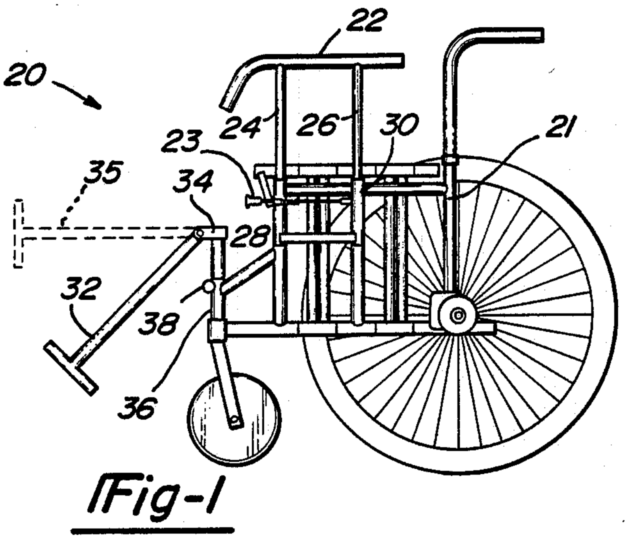
FIG. 1 is a side view of the basic wheelchair assembly showing the left frame portion.

FIG. 1 shows the main features of the adjustable portable wheelchair 20 as disclosed by the present invention. The wheelchair is formed of a conventional left frame 21, an associated right frame (not shown), and foldable interconnecting body members. As is known in the prior art, this wheelchair can be folded along its center longitudinal axis so that the left and right frame members are brought into contact with each other to make the wheelchair assembly more compact and more easily transportable. This is typically done in order to allow the chair to be transported in the back seat of an automobile of the like.

The present invention modifies the conventional wheelchair assembly by providing novel arm rest and leg support assemblies.

The arm rest 22 is adjustably mounted to the left frame 21 by an adjustable arm rest mounting mechanism 23. The arm rest 22 has downwardly extending columns 24, 26 that are received within receiving tubes 28, 30 formed on the left frame assembly 21. As can be seen, particularly in FIG. 2, the arm rest columns 24, 26 are formed with holes 31 that provide a set of upper and lower mounting holes.

The leg support 32 is mounted to a post member 34 and can be adjusted to several vertical positions, one of which is shown in phantom at 35. The post 34 is rotatably received within a socket 36, and a pin mechanism 38 serves to lock the post 34 within the socket 36. The post 34 can be rotated to an out-of-the-way position relative to the socket 36 in which the leg support 32 would not extend forwardly as shown, but instead would overlie the left frame 21 and extend rearwardly towards the rear of the chair.

Figure 3:
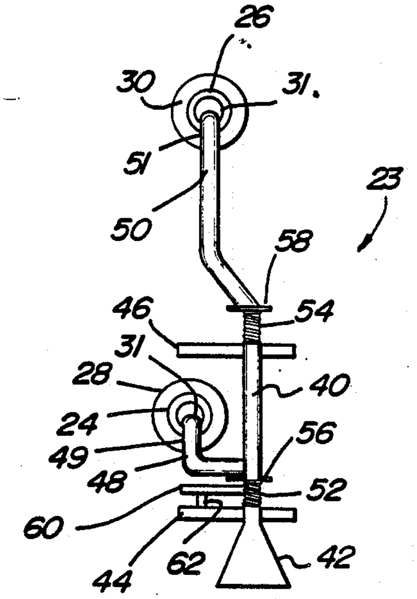
FIG. 3 is a cross-section through an arm rest securing mechanism as disclosed by the present invention.
Figure 2:
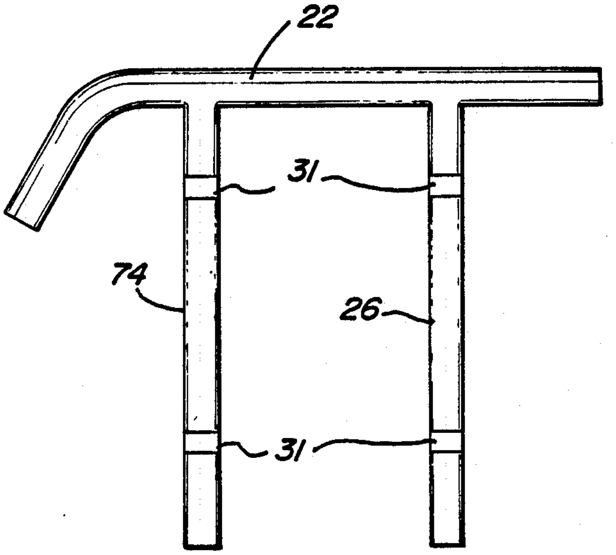
FIG. 2 is a cross-sectional view through an arm rest for a wheelchair as disclosed by the present invention.

Looking now at FIGS. 2 and 3, the arm rest securing mechanism 23 will be described in detail. As explained above, FIG. 2 illustrates that the arm rest is formed with a set of upper holes and a second set of lower holes formed on the columns 24,26. The columns 24,26 are received within receiving posts 28,30, and a pin actuator rod 40 serves to lock the columns 24, 26 within the receiving posts 28,30. As shown, the pin actuator rod 40 has a handle portion 42 that may easily be grasped by the seat occupant to allow the arm rest 22 to be released and adjusted. The pin actuating rod 40 is received in mounting flanges 44, 46 that form a part of the left frame 21 of the wheelchair 20 of the present invention. As is shown, a front pin 48 extends off the front portion of the pin actuating rod 40, and the rear portion of the pin actuating rod 40 bends inwardly towards the chair to form a second pin portion 50. The first pin 48 is mounted so as to align with a hole 49 formed in the receiving post 28 and acts to lock one of the holes 31 formed in the column 24. The second pin 50 is mounted so as to align with a hole 51 formed in the receiving post 30 and will also align with the hole 31 formed in the column 26 of the arm rest 22.

A spring 52 is mounted on the pin actuating rod 40 and pushes the rod rearwardly away from the frame flange 44. A second spring 54 is also mounted on the pin actuating rod 40 and pushes the rod 40 away from the frame flange 46. The springs 52, 54 act to bias the pins 48, 50 into locked positions within holes 31. Spring flanges 56 and 58 are formed on the pin actuator rod 40 in order to give the springs 52,54 a surface to act upon in order to push the pin actuating rod 40 rearwardly into the locked position.

A pivotal latch member 60 is provided on a pin 62 that is formed off the frame flange 44. The pivotal latch member 60 acts to latch the pin actuating rod 40 in its retracted unlocked position. This is accomplished by pulling on the handle 42 and retracting the actuating rod 40 until it has moved into its retracted position. At that time, the spring flange 56 will be between the frame flange 44 and the pivotal latch member 60. The pivotal latch member 60 can then be turned upwardly and acts to restrain the pin actuation rod 40 at its retracted unlocked position. This allows the seat occupant to adjust the position of the arm rest without having to keep the handle 42 manually retracted. Once the arm rest has been moved to its selected position, the seat occupant can release the pivotal latch member 60 and allow the pin actuating rod 40 to be biased forwardly back into its locked position, thus securing the arm rest at its newly selected position.

Figure 4:
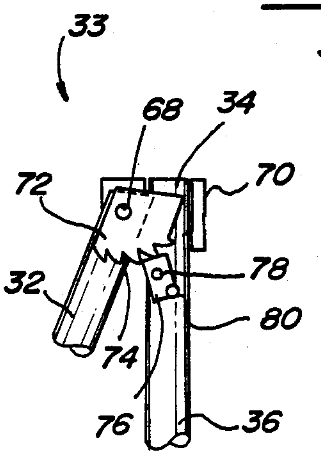
FIG. 4 is a cross-section through a leg support vertical adjustment assembly as disclosed by the present invention.
Figure 5:
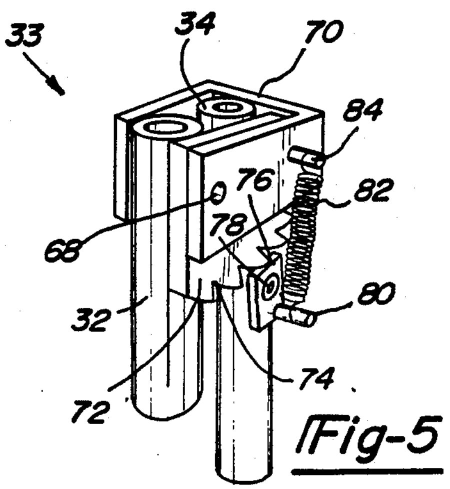
FIG. 5 is a perspective view of the leg support vertical positioning assembly as disclosed by the present invention.

FIGS. 4 and 5 show the vertical adjustment mechanism for the leg supports 32 of the wheelchair assembly 20 of the present invention. As explained above, the leg support 32 is pivotally attached to the tube-like post 34 which is rotatably received within a socket 36. The leg support is pinned at 68 to a C-clamp 70 that is attached to the tube-like portion of the post 34 to provide the pivotal mounting. A toothed ratchet or gear-like member 72 is fixed to the leg support 32 and acts to allow the leg support 32 to be incremetally adjusted. Teeth 74 are formed on the ratchet or gear-like member 72 and receive a dog or cam 76 that is pinned at 78 to the post 34 and acts to lock the ratchet or gear-like member 72 and the associated leg support 32 at any selected vertical position. A handle 80 is provided on the dog or cam 76 that acts to maintain the cam biased into a locked position with respect to the ratchet or gear-like member 72. The handle 890 can be actuated to cause the dog or cam 76 to be pulled out of its locked position and allow the leg support 32 to be adjusted. A spring 82 is mounted to the handle 80 and is fixed to the C-clamp member 70 at a spring pin 84. The spring 82 acts to bias the handle 80 upwardly in order to maintain the cam 76 locked into any of the teeth 74 formed on the gear-like member 72. By turning the handle 80 clockwise with respect to the pin 78, the dog or cam member 76 can be withdrawn from the tooth 74, thus allowing the gear-like member 72 and its associated leg support 32 to be adjusted with respect to a vertical axis.

As shown in FIG. 5, the C-clamp 70 receives the ratchet or gear-like member 72, the associated leg support 32 and the post 34 within it.

Figure 7:
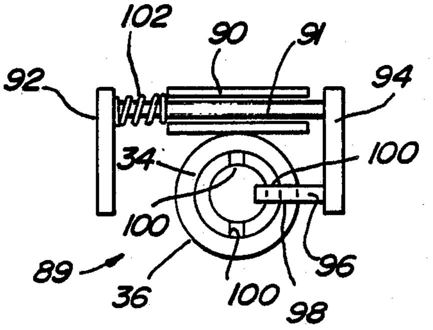
FIG. 7 is a cross-section through the pin locking mechanism as shown in FIG. 6.
Figure 6:
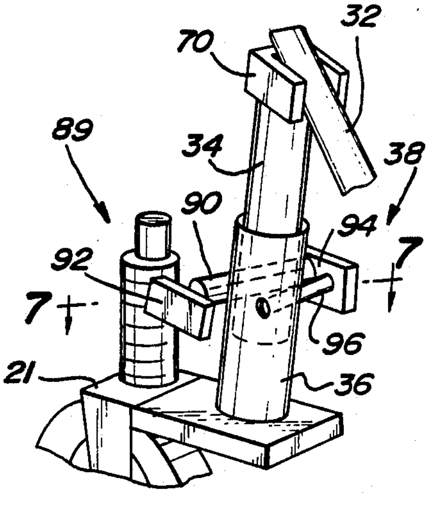
FIG. 6 is a perspective view showing the pin locking mechanism for locking the leg support at various rotated positions.

FIGS. 6 and 7 show the pin clamping assembly that allows the post 34 and its associated leg support 32 to be rotated into an out-of-use position or removed entirely from the wheelchair frame 21. The pin releasing mechanism 89 includes a hollow tube 90 that is fixed transverse to the socket 36 and receives an actuating bar 91 that connects an actuating button 92 to a base portion 94. A pin 96 is formed off the base portions 94 and extends through a hole 98 formed in the socket 36. Holes 100 are formed within the post 34 at selected angular positions and allow the post 34 to be rotated to several positions and locked by the pin 96.

In the position shown in FIG. 6, the post 34 is locked at an angular position that allows the leg support to extent forwardly from the wheelchair; however, it is to be understood that by using one of the other holes 100 illustrated in FIG. 7, the leg support can be rotated outwardly so as to not extent forwardly from the wheelchair, but instead to extend rearwardly and overlie a portion of the left frame 21. A spring 102 is mounted upon the rod 91 and acts to push off on the actuator button 92 and bias the entire assembly 92, 91, 94, 96 into a locked position. By pushing the button 92 against the force of spring 102, the pin 96 can be withdrawn from the hole 100, and the post 34 can be rotated into a selected angular position or removed entirely.

In order to make the entire wheelchair assembly even more portable and easily transportable, it is preferable to use a lightweight metal alloy to construct the various frame members. In the preferred embodiment, the frame members are formed of titanium.

A working embodiment of the present invention has been disclosed. However, it is to be understood that several modifications would be easily envisioned by a worker in the art and are considered part of the present invention. The intended scope of the present invention can best be understood upon consideration of the appended claims.

I claim:

1. A frame for use on a wheelchair that comprises:

a main frame section;

leg support means that are vertically adjustable with respect to said main frame section, said leg support means is pivotally mounted to a post, said post being rotatably received within said main frame section;

said leg support means having an associated ratchet fixed thereto, said post having a dog pivotally pinned thereto, and said dog being biased to a locked position where it engages a tooth of said ratchet in order to fix said leg support means at a selected position and provide adjustability for said leg support means and said leg support means being adjusted into one of several vertical position and in addition being rotated into one of several rotational positions with respect to said main frame section; and arm rest means being mounted at one of several positions with respect to said main frame section.

2. A frame for a wheelchair as recited in claim 1, and further wherein said post comprises a tube and C-clamp at the top of said tube and wherein said leg support means is pivotally pinned within said C-clamp and said ratchet fixed to said leg support means is also received within the C-clamp.

3. A frame for a wheelchair as recited in claim 2, and further wherein said dog has a handle, said C-clamp further comprises a spring mounting pin and a spring is mounted on said spring mounting pin and connected to said handle, said spring biasing said dog into its locking position.

4. A frame for a wheelchair as recited in claim 3, and further wherein said post is received within a socket that forms part of said main frame section; and a tube fixed transverse to the axis of said socket said tube receiving a pin releasing mechanism that serves to lock the post at a selected position with respect to said socket, thus allowing the positioning of said leg support means.

5. A frame for a wheelchair as recited in claim 4, and further comprising said pin-releasing mechanism comprising a rod that extends through said tube, a button at one end of said tube mounted to said rod, a base member mounted to the end of said rod at the opposite end of said tube, a pin extending from said base, a hole formed through the socket and aligned with said pin and several holes within said post at selected angular positions to receive said pin when said post has been rotated to the selected position.

6. A frame for a wheelchair as recited in claim 5, and further wherein a spring is mounted between the button and said tooth in order to bias the entire pin-releasing mechanism into a locking position and wherein said button can be pushed against the force of the spring to move the pin-releasing mechanism to an unactuated position and release the pin from the hole within the post and allow the post and its associated leg support to be rotated to a newly selected position.

7. A frame for a wheelchair as recited in claim 6, and further wherein said post can be removed from said socket when said pin release mechanism is at its unactuated position.

8. A frame for a wheelchair as recited in claim 7, and further wherein said arm rest positioning is provided by an arm rest adjustment mechanism comprising an arm rest release rod that is slidably mounted with respect to said main frame section;

said arm rest release rod having pin portions that extend through said receiving tubes;

said arm rest having downwardly extending columns in which sets of aligned holes are formed;

said pin portions of said arm rest release rod being engagable with said holes of said columns of said arm rest;

springs mounted between said main frame and said arm rest release rod, said springs biasing said arm rest release rod into a first locked position where said pins are received within said hole in said arm rest column;

a handle on said arm rest release rod that may be pulled against the force of said springs into a second retracted position to withdraw said pins from said holes in said arm rest columns; and a pivotal lock member pivoted to said main frame and being movable to a position where it blocks movement of said arm rest release rod back into its first locked position after it has been retracted by pulling on said handle to the second retracted position.

9. A frame for a wheelchair, comprising:

a main frame;

an arm rest that may be mounted at any one of several vertical positions with respect to said main frame or may be removed entirely from said main frame;

said arm rest comprising two downwardly extending column portions;

said main frame comprising two upwardly open receiving tubes that receive said downwardly extending columns of said arm rest;

holes formed in said downwardly extending columns of said arm rest; and an arm rest locking mechanism mounted upon said main frame and actuatable in order to engage said holes on said columns of said arm rest in order to lock said arm rest at a selected one of several vertical positions with respect to said main frame, adjustability of said arm rest is provided by an arm rest adjustment mechanism comprising an arm rest release rod that is slidably mounted with respect to said main frame;

said arm rest release rod having pins that extend through said two upwardly open receiving tubes;

said arm rest having downwardly extending columns with sets of aligned holes thereon;

said pins of said arm rest release rod being engagable with said holes of said columns of said arm rest;

springs mounted between said main frame and said arm rest release rod, said springs biasing said arm rest release within said hole in said arm rest column;

a handle on said arm rest release rod that may be pulled against the force of said springs into a second retracted position to withdraw said pins from said holes in said arm rest columns; and a pivotal lock member pivoted to said main frame and being movable to a position where its blocks movement of said arm rest release rod back into its first locked position after it has been retracted by pulling on said handle to the second retracted position.

10. A frame for a wheelchair that comprises:

a main frame portion;

a leg support means that may be selectively rotated into any one of several positions with respect to said main frame;

said leg supports means being pivotally mounted to a post, said post being rotatably received within said main frame section, said post is received within a socket that forms part of said main frame section; and a tube fixed transverse to a longitudinal axis of said socket, said tube receiving a pin releasing mechanism that serves to lock the post at a selected position with respect to said socket, thus allowing the positioning of said leg support.

11. A frame for a wheelchair as recited in claim 10, and further comprising said pin-releasing mechanism comprising a rod that extends through said tube, a button at one end of said tube mounted to said rod, a base mounted to the end of said rod at the opposite end of said tube, a pin extending from said base, a hole formed through the socket and aligned with said pin and several holes within said post at selected positions to receive said pin when said post has been rotated to the selected position.

12. A frame for a wheelchair as recited in claim 11, and further wherein a spring is mounted between the button and a tooth in order to bias the entire pin-releasing mechanism into a locking position and wherein said button can be pushed against the force of the spring to move the pin-releasing mechanism to an unactuated position and release the pin from the hole within the post and allow the post and its associated leg supoort to be rotated to a newly selected position.

13. A frame for a wheelchair as recited in claim 12, and further wherein said post can be removed from said socket when said pin release mechanism is at its unactuated position.

* * * * *

UNITED STATES PATENT AND TRADEMARK OFFICE
CERTIFICATE OF CORRECTION

PATENT NO. : 4,957,303

DATED : 09/18/90

INVENTOR(S) : Roger J. Romatz

It is certified that error appears in the above-identified patent and that said Letters Patent is hereby corrected as shown below:

In col. 3, line 44, change "of" to --or--

In col. 4, line 31, change "provided" to --pivoted--

In col. 4, line 40, change "actuation" to --actuating--

In col. 4, line 58, change "incremetally" to --incrementally--

In col. 5, line 27, change "extent" to --extend--

In col. 5, line 30, change "extent" to --extend--

In col. 5, line 67, change "position" to -- positions--

In col. 6, line 6, after "and" insert --a--

In col. 7, line 35, after "release" insert --rod into a first locked position where said pins are received--

In col. 8, line 9, change "supports" to --support--

In col. 8, line 36, change "supoort" to --support--

Signed and Sealed this

Twenty-third Day of June, 1992

*Attest:*

DOUGLAS B. COMER

*Attesting Officer*

*Acting Commissioner of Patents and Trademarks*